US007328255B2

United States Patent
Ooki

(10) Patent No.: US 7,328,255 B2
(45) Date of Patent: Feb. 5, 2008

(54) COMMUNICATION SYSTEM, AND CONNECTION SETTING METHOD AND CONNECTION SETTING PROGRAM OF EXCHANGE AND TERMINAL

(75) Inventor: Yasuomi Ooki, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 661 days.

(21) Appl. No.: 10/151,002

(22) Filed: May 21, 2002

(65) Prior Publication Data

US 2002/0178267 A1  Nov. 28, 2002

(30) Foreign Application Priority Data

May 22, 2001  (JP) ............................. 2001-152990

(51) Int. Cl.
*G06F 15/16* (2006.01)
(52) U.S. Cl. ..................... 709/219; 217/218; 217/227; 217/228; 217/229; 455/426.1; 455/426.2; 379/14; 370/371
(58) Field of Classification Search ................ 709/213, 709/226, 227, 228, 217–219, 229; 455/517, 455/426.1, 426.2; 370/385, 371; 379/14
See application file for complete search history.

(56) References Cited

U.S. PATENT DOCUMENTS

| 4,672,656 A | * | 6/1987 | Pfeiffer et al. | ............... 455/410 |
|---|---|---|---|---|
| 5,436,889 A | * | 7/1995 | Matsumoto et al. | ........ 370/385 |
| 5,771,352 A | * | 6/1998 | Nakamura et al. | .......... 709/227 |
| 6,035,330 A | * | 3/2000 | Astiz et al. | ................. 709/218 |
| 6,229,883 B1 | * | 5/2001 | Kakizaki et al. | ....... 379/142.04 |
| 6,321,096 B2 | * | 11/2001 | Lautenschlager et al. | ... 455/461 |
| 6,609,148 B1 | * | 8/2003 | Salo et al. | ................... 709/217 |
| 6,745,030 B2 | * | 6/2004 | Koyama | ..................... 455/433 |
| 6,754,708 B1 | * | 6/2004 | Sabatier et al. | ............. 709/227 |
| 2001/0014614 A1 | | 8/2001 | Lautenschlager et al. | |
| 2001/0054112 A1 | * | 12/2001 | Nobakht et al. | ............ 709/245 |
| 2002/0009073 A1 | * | 1/2002 | Furukawa et al. | .......... 370/352 |
| 2002/0013823 A1 | * | 1/2002 | Eubanks | ..................... 709/217 |
| 2002/0037736 A1 | * | 3/2002 | Kawaguchi et al. | ........ 455/518 |
| 2002/0069278 A1 | * | 6/2002 | Forslow | ..................... 709/225 |

FOREIGN PATENT DOCUMENTS

JP  10-271117  10/1998

* cited by examiner

*Primary Examiner*—David Wiley
*Assistant Examiner*—Alina N. Boutah
(74) *Attorney, Agent, or Firm*—Foley & Lardner LLP

(57) ABSTRACT

A communication system for connecting a terminal connected to an exchange, to an outside communication network, through the exchange for connecting with the communication network, in which the terminal sends the transmission data including the information of the terminal identification value for uniquely identifying the terminal to the exchange so as to request the exchange setting processing for connecting the terminal to the communication network, while when receiving the request of the setting processing from the terminal, the exchange checks whether the communication setting for the terminal is stored, by using the received terminal identification value of the terminal, with reference to the communication setting information being stored for every terminal, and performs the setting processing for connecting the terminal to the communication network according to the stored communication setting when the communication setting for the terminal is stored.

20 Claims, 8 Drawing Sheets

FIG. 4

| PORT NUMBER | MAC ADDRESS | IP ADDRESS | EXTENSION NUMBER |
|---|---|---|---|
| 1 | AAA | DDD | 10 |
| 2 | AAB | DDE | 11 |
| 3 | AAC | DDF | 12 |
| 4 | ABC | DEF | 13 |
| 5 | ACC | DFF | 14 |

FIG. 5

| TERMINAL | DESIRED EXTENSION NUMBER | MAC ADDRESS | IP ADDRESS | EXCHANGE IP ADDRESS | TRANSMISSION DATA |
|---|---|---|---|---|---|
| 20-1 | 10 | AAA | DDD | ××× | △×△ |

FIG. 6

| TERMINAL | DESIRED EXTENSION NUMBER | MAC ADDRESS | IP ADDRESS | EXCHANGE IP ADDRESS | TRANSMISSION DATA |
|---|---|---|---|---|---|
| 20-2 | 14 | AAC | DDF | ××× | △○△ |

| TERMINAL | DESIRED EXTENSION NUMBER | MAC ADDRESS | IP ADDRESS | EXCHANGE IP ADDRESS | TRANSMISSION DATA |
|---|---|---|---|---|---|
| 20-3 | 10 | ABC | DEF | ××× | △△△ |

| TERMINAL | DESIRED EXTENSION NUMBER | MAC ADDRESS | IP ADDRESS | EXCHANGE IP ADDRESS | TRANSMISSION DATA |
|---|---|---|---|---|---|
| 30 | NIL | AAB | DDE | ××× | △○○ |

500, 501, 511, 521, 531, 541

COMMUNICATION SYSTEM, AND CONNECTION SETTING METHOD AND CONNECTION SETTING PROGRAM OF EXCHANGE AND TERMINAL

BACKGROUNDS OF THE INVENTION

1. Field of the Invention

The present invention relates to a connection of terminals to a communication network through an exchange for connecting with an external communication network, and more particularly to a communication system capable of automatically processing a connection setting for connecting the terminals such as a telephone and a computer to the external communication network, and a connection setting method and a connection setting program of the exchange and the terminals.

2. Description of the Related Art

Recently, there has evolved wide usage of a system having telephone terminals, personal computer terminals, and the like connected and used in a mixed way on the Internet.

The devices connected on the Internet are distinguished from each other by their IP addresses. Since a plurality of terminals of different types and different manufacturing companies are connected on the same network, it is necessary to set each IP address and extension number as the identification information of each terminal when using these terminals on the Internet.

Hitherto, there have been two methods for obtaining the IP address of each terminal; a manual setting method and an automatic setting method in which use is made of a DHCP (Dynamic Host Configuration Protocol Server).

For example, in the automatic technique of setting by using the DHCP server, the DHCP server built in an exchange assigns each IP address to the terminals on a network and at the same time notifies the terminals of the IP address.

However, the conventional setting method for connecting a terminal to a communication network has the following problems.

At first, it is not always possible to obtain the expected IP address in the case of automatic setting, and there is a problem that an IP address which is different from the previous IP address may be assigned in the case of a restart. For example, when the IP address of a terminal connected to an exchange is changed by a restart, the exchange regards the terminal as a different terminal and the terminal cannot use the information previously set to it, such as the telephone book information. Further, acquisition of IP address by the manual setting is very troublesome.

Secondly, since there is no means of knowing the IP address of a communication party in the general communication method, it is necessary to enter the IP address of the communication party by hand. In order to automatically obtain the IP address of a communication party and establish a communication, it is necessary to set a special server and a client, or previously register the IP address of the communication party in the DHCP server by hand. Therefore, in order that a terminal of an exchange knows the IP address of a destination exchange, it is necessary to enter the IP address of the destination exchange into the terminal by hand, or it is necessary to previously enter the IP address of the destination exchange in the DHCP server by hand.

Thirdly, the data flowing on the Internet arrives at the communication party in various orders depending on the state of network congestions or physical distance between the communication parties, and therefore, it is difficult to foresee the arriving order. For example, when a plurality of exchange terminals are located in an office and they are switched on at the same time, it is impossible to foresee the order of the data being registered in an exchange.

Therefore, for example, when a terminal of the extension number X is to be located at the seat of a staff member A and a terminal of the extension number Y is to be located at the seat of a staff member B, it is necessary on the exchange side to set MAC addresses of the terminals for assigning the extension numbers X and Y. Here, the MAC address is formed by the alphanumeric letters of 12 digits, and a user's manual task of entering the MAC addresses of the respective terminals is very troublesome.

SUMMARY OF THE INVENTION

In order to solve the above problem of the conventional technique, a first object of the present invention is to provide a communication system in which terminals can take over the previous setting even if the IP address of each terminal is changed, by automatically transmitting the MAC address of each terminal to an exchange and recording it in the exchange. There is also an object of providing a connection setting method and connection setting program of the exchange and the terminals.

In order to solve the above problem of the conventional technique, a second object of the present invention is to provide a communication system in which the IP address of an exchange can be automatically registered into a DHCP server and at the activation of terminals, the IP addresses of the terminals and the IP address of the exchange can be automatically obtained by installing the DHCP server in the exchange.

In order to solve the above problem of the conventional technique, a third object of the present invention is to provide a communication system in which a trouble of entering the MAC address of each terminal into an exchange by hand at every activation time can be eliminated by specifying the desired extension number and notifying it to the exchange for registration. Then, the extension numbers can be automatically assigned to the terminals other than a terminal requesting a specified extension number, without the need of entering the extension number.

According to the first aspect of the invention, there is provided a communication system for connecting a terminal connected to an exchange, to an outside communication network, through the exchange for connecting with the communication network. The terminal sends terminal identification information for uniquely identifying the terminal to the exchange so as to request a connection setting from the exchange for connection with the communication network. Upon receipt of the above request, the exchange searches for stored communication setting information of the terminal, according to the received terminal identification information of the terminal, and performs the connection setting for connecting the terminal to the communication network based on the communication setting information.

In the preferred construction, the exchange checks whether the communication setting information of the terminal is stored, by using the received terminal identification information of the terminal in the connection setting request from the terminal, and performs the connection setting, according to the stored communication setting, when the communication setting information of the terminal is stored.

In another preferred construction, the terminal sends terminal setting information to the exchange indicating the content of its desiring setting, which is included in the transmission data, and the exchange determines whether the setting for the terminal indicated by the terminal setting information is possible, with reference to the received terminal setting information. Then, the exchange performs the connection setting for connecting the terminal to the communication network, based on the terminal setting information, when the setting indicated by the terminal setting information is possible.

In another preferred construction, the terminal enters its own extension number in the terminal setting information.

In another preferred construction, the terminal identification information of the terminal is a MAC address of the terminal.

In another preferred construction, the communication network is the Internet.

In another preferred construction, the terminal automatically sends the connection setting request to the exchange at activation.

According to the second aspect of the invention, there is provided a method in which an exchange is connected to an outside communication network, for relaying a connection from a terminal to the communication network. The exchange receives a connection setting request for connecting the terminal to the communication network, including terminal identification information for uniquely identifying the terminal, from the terminal. The exchange searches for stored communication setting information of the terminal, according to the received terminal identification information of the terminal and performs the connection setting for connecting the terminal to the communication network, according to the communication setting information.

In the preferred construction, the exchange checks whether the communication setting information of the terminal is stored, by using the received terminal identification information of the terminal, and performs the connection setting, according to the stored communication setting, when the communication setting information of the terminal is stored.

In another preferred construction, the exchange receives terminal setting information indicating content of a desired setting, determines whether the setting for the terminal indicated by the terminal setting information is possible, with reference to the received terminal setting information of the terminal, and performs the connection setting for connecting the terminal to the communication network, based on the terminal setting information, when the setting indicated by the terminal setting information is possible.

In another preferred construction, the terminal setting information of the terminal includes extension number whose setting is requested by the terminal.

In another preferred construction, the terminal identification information of the terminal is a MAC address of the terminal.

In another preferred construction, the communication network is the Internet.

According to the third aspect of the invention, there is provided a terminal to be connected to an outside communication network, through an exchange for connecting the terminal to the communication network. The terminal requests that the exchange perform a connection setting for connecting the terminal to the communication network, by sending to the exchange transmission data including terminal identification information for uniquely identifying the terminal. At the exchange, stored communication setting information of the terminal is searched according to the received terminal identification information of the terminal and the connection setting is performed according to the communication setting information.

In the preferred construction, the terminal sends terminal setting information indicating the content of its desiring setting, which is included in the transmission data, to the exchange, when requesting the connection setting from the exchange.

In another preferred construction, extension number whose setting is desired is included in the terminal setting information.

In another preferred construction, the terminal identification information is a MAC address of the terminal.

In another preferred construction, the communication network is the Internet.

In another preferred construction, the terminal automatically sends the connection setting request to the exchange at activation.

According to another aspect of the invention, a method of setting a connection from a terminal to an outside communication network, in an exchange connected to the communication network, for relaying the connection, comprising the following steps of the terminal sends terminal identification information for uniquely identifying the terminal to the exchange, to request a connection setting from the exchange with the communication network, and upon receipt of the connection setting request, the exchange searches for stored communication setting information of the terminal, according to the received terminal identification information of the terminal and performs the connection setting for connecting the terminal to the communication network, according to the communication setting information.

In the preferred construction, the connection setting method further comprising the steps of storing the communication setting information for every terminal to serve as a reference, checking whether the communication setting information of the terminal is stored, by using the terminal identification information of the terminal in the connection setting request, and performing the connection setting for connecting the terminal to the communication network, according to the stored communication setting information, when the communication setting information of the terminal is stored.

In another preferred construction, the connection setting method comprising the steps of receiving terminal setting information indicating content of setting desired for the connection setting, in the connection setting request from the terminal, determining whether the setting for the terminal indicated by the terminal setting information is possible, with reference to the received terminal setting information of the terminal, and performing the connection setting for connecting the terminal to the communication network, based on the terminal setting information, when the setting indicated by the terminal setting information is possible.

In another preferred construction, the terminal setting information of the terminal includes extension number whose setting is requested by the terminal.

According to another aspect of the invention, a connection setting program is provided for connecting a terminal to an outside communication network, by controlling a computer, comprising the following functions such that:

the terminal sends terminal identification information for uniquely identifying the terminal to the exchange, so to request a connection setting from the exchange with the communication network; and upon receipt of the connection setting request, the exchange searches for stored communication setting information of the terminal, according to the received terminal identification information of the terminal and performs the connection setting for connecting the terminal to the communication network, according to the communication setting information.

According to a further aspect of the invention, a server connected to an outside communication network, for setting a connection from a terminal to the communication network, the server which receives a connection setting request for connecting the terminal to the communication network, including terminal identification information for uniquely identifying the terminal; and searches for stored communication setting information of the terminal, according to the received terminal identification information of the terminal and performs the connection setting for connecting the terminal to the communication network, according to the communication setting information.

In the preferred construction, the server checks whether the communication setting information of the terminal is stored, by using the received terminal identification information of the terminal when receiving the connection setting request from the terminal, and performs the connection setting, according to the stored communication setting, when the communication setting information of the terminal is stored.

In another preferred construction, the server receives terminal setting information indicating content of the desired setting, in the connection setting request from the terminal, determines whether the setting for the terminal indicated by the terminal setting information is possible, with reference to the received terminal setting information of the terminal; and performs the connection setting for connecting the terminal to the communication network, based on the terminal setting information, when the setting indicated by the terminal setting information is possible.

In another preferred construction, the terminal setting information of the terminal includes extension number whose setting is requested by the terminal.

In another preferred construction, the terminal identification information of the terminal is MAC address of the terminal.

In another preferred construction, the communication network is the Internet.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative of the invention, but are for explanation and understanding only.

In the drawings:

FIG. 4 is a view showing the data to be stored into a memory of the exchange according to an embodiment of the present invention;

FIG. 5 is a view showing a list of the data to be stored into a memory of the terminal according to an embodiment of the present invention;

FIG. 6 is a view showing a list of the data to be stored into a memory of the terminal according to an embodiment of the present invention;

FIG. 7 is a view showing a list of the data to be stored into a memory of the terminal according to an embodiment of the present invention;

FIG. 8 is a view showing a list of the data to be stored into a memory of the terminal according to an embodiment of the present invention;

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In a server such as an exchange (here, referred to as Internet exchange) for controlling each terminal such as a telephone connected on a communication network such as the Internet, the present invention has the objective of eliminating the need for entering set values by hand every time the terminal is connected the server (Internet exchange) and the server is activated and to realize basic communication operation immediately upon activation, by automatically exchanging mutual information between the Internet exchange that is the server and each terminal.

Figure 12:
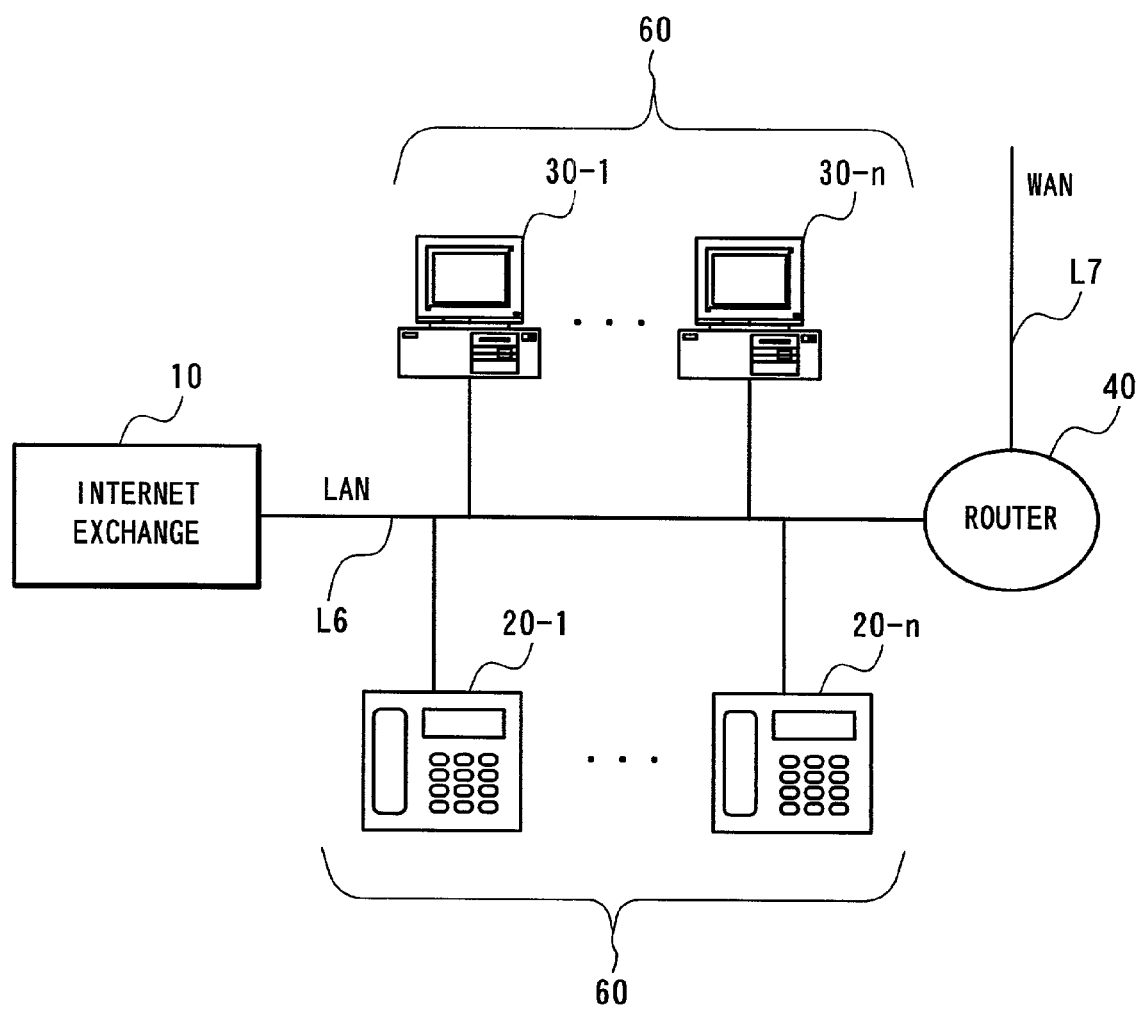
FIG. 12 is a block diagram showing the network structure of a communication system according to an embodiment of the present invention.

FIG. 12 is a view showing an example of a network structure of the communication system which adopts the present invention.

An Internet exchange 10 assigns each IP address to a plurality of terminals 60 such as IP telephones 20-1 to 20-$n$ and personal computers (PC) 30-1 to 30-$n$ and at the same time, notifies the IP address of the Internet exchange 10 itself to the respective terminals, by a built-in Internet address (hereinafter, referred to as IP address: Internet Protocol Address) delivery server (hereinafter, referred to as DHCP server: Dynamic Host Configuration Protocol Server) 11.

The respective terminals 60 (IP telephones 20-1 to 20-*n* and PCs 30-1 to 30-*n*) register their own information in the Internet exchange 10 of the notified exchange IP address. Namely, the respective terminals 60 request the Internet exchange 10 to do the setting processing for connecting themselves with the communication network. At this time, the physical addresses (MAC addresses) inherent of the terminals 60 are simultaneously registered into the Internet exchange 10 as the terminal identification value for uniquely identifying the terminal 60. Thus, even if IP address different from that of the last time is assigned to a terminal 60 at a restart after power shutdown, the Internet exchange 10 can uniquely identify the terminal based on the physical address inherent of the terminal and take over the setting information of any terminal 60 within the Internet exchange 10 itself.

Although the extension number is generally assigned to the respective terminals 60 (IP telephones 20-1 to 20-*n* and PCs 30-1 to 30-*n*) in the order of their registration, according to the initial value within the Internet exchange 10 in the Internet, it is impossible to foresee the order in which the respective terminals are registered in the Internet exchange 10, because the order varies depending on the network congestion. Therefore, it is also impossible to foresee which extension number is assigned to the respective terminals.

Therefore, the respective terminals 60 (IP telephones 20-1 to 20-*n* and PCs 30-1 to 30-*n*) notify their own desiring extension numbers to the Internet exchange 10 at a registration into the Internet exchange 10. The Internet exchange 10 having received these extension numbers assigns the desired extension number to a terminal only when this extension number does not overlap with that of the other terminal, thereby realizing assignment of desired extension number.

According to the above, the terminal 60 sends the terminal setting information specifically indicating the content of the setting such as the desired extension number, to the Internet exchange 10, hence to get the assignment of extension number according to the specified terminal setting information.

Figure 1:
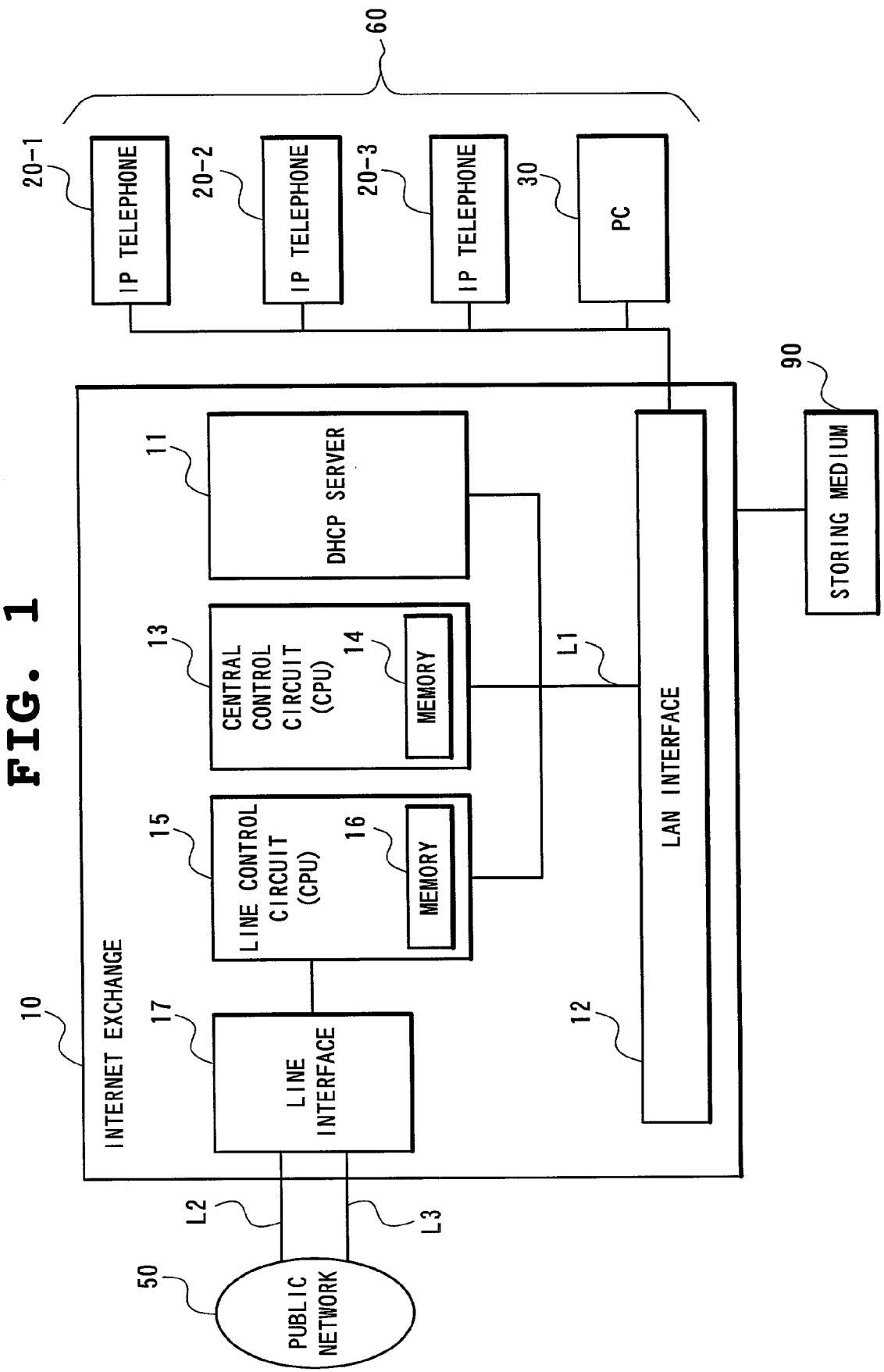
FIG. 1 is a block diagram showing the structure of an exchange according to an embodiment of the present invention.

FIG. 1 is a block diagram showing the structure of the Internet exchange 10 (Internet telephone exchange main device) according to an embodiment of the present invention.

In FIG. 1, as terminals 60 to be connected to the Internet exchange 10, for example, the IP telephones 20-1, 20-2, and 20-3 and the PC (personal computer) 30 with a telephone function installed there are connected to the Internet exchange 10.

The Internet exchange 10 is provided with a LAN interface 12 connected to a LAN (Local Area Network), a central control circuit 13 and its memory 14 for controlling the LAN line L1 inside the Internet exchange 10 and the whole of the Internet exchange 10, a DHCP server 11 for delivering the IP addresses to the respective terminals 60, a line control circuit 15 and its memory 16 for controlling a line interface 17 of a public network 50 and controlling a connection and shutdown of the respective terminals 60 with an outside line, and it is connected to the outside lines L2 and L3 connected to the public network.

Figure 2:
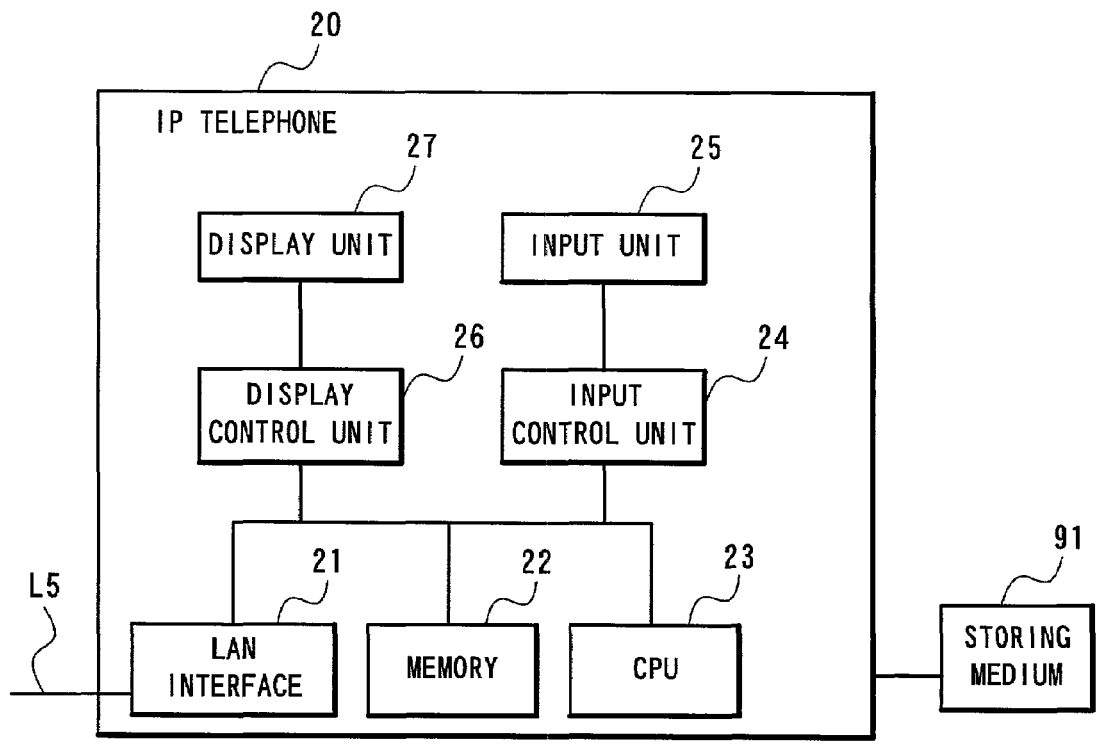
FIG. 2 is a block diagram showing the structure of an IP telephone according to an embodiment of the present invention.

FIG. 2 is a block diagram showing the structure of the IP telephone 20 according to the embodiment of the present invention.

In the example of FIG. 2, the IP telephone 20 is provided with a LAN interface 21 for communicating with the Internet exchange 10, a memory 22, a CPU 23 for controlling the data transfer within the IP telephone, an input control unit 24 for controlling the data transfer to an input unit 25, and a display control unit 26 for showing characters and images on a display unit 27. The input unit 25 can be realized by keys, for example, button keys of the IP telephone, and the display unit 27 can be realized by, for example, a liquid crystal display panel for displaying characters and images.

Figure 3:
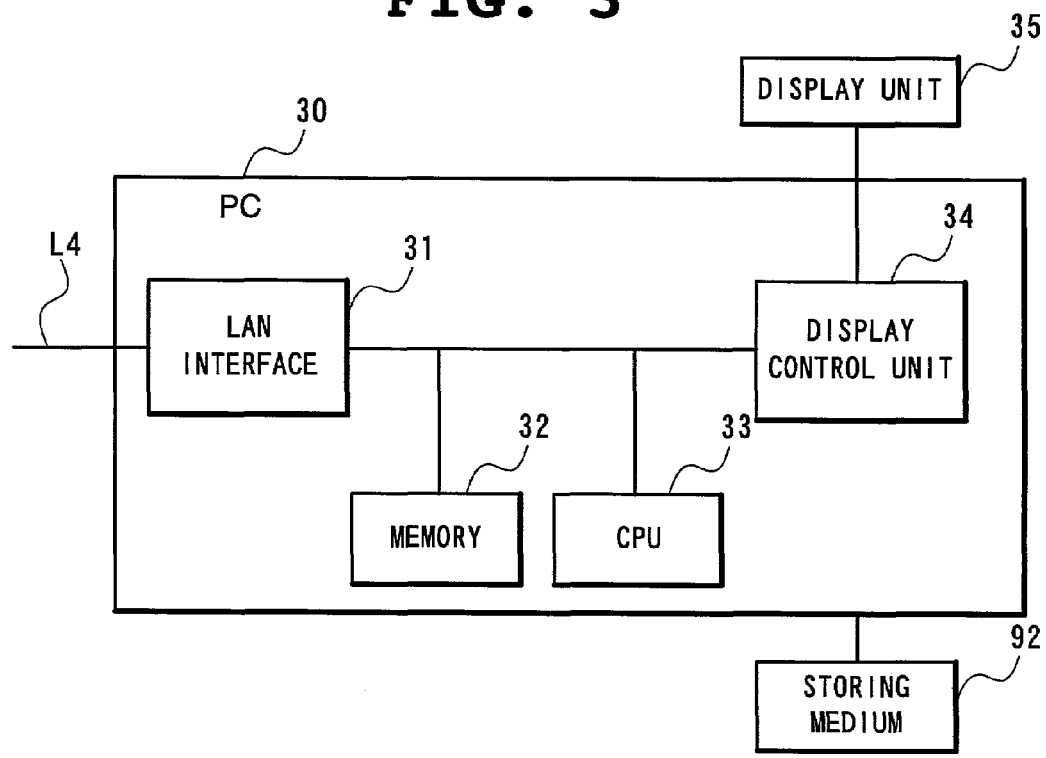
FIG. 3 is a block diagram showing the structure of a personal computer according to an embodiment of the present invention.

FIG. 3 is a block diagram showing the structure of the PC 30 according to the embodiment of the present invention.

In the example of FIG. 3, the PC 30 is provided with a LAN interface 31 for communicating with the Internet exchange 10, a memory 32, a CPU 33 for controlling the data transfer between the communication interface, the memory 32, and a screen controller and running a computer program, a display control unit 34 for showing characters and images on a display unit 35 (display), and the display unit 35 for displaying the characters and images sent from the display control unit 34, and it is connected to the Internet exchange 10 through an extension line L4.

FIG. 4 is a view showing the data to be stored in the memory 14 of the Internet exchange 10 according to the embodiment of the present invention, and FIG. 5 is a view showing each list of the data to be stored in the memories 22 and 32 of the respective terminals 60 according to the embodiment of the present invention.

The data stored in the memory 14 shown in FIG. 4 is formed by the area 400 of each port number in the Internet exchange 10, the area 401 of the MAC address of each terminal 60 connected to every port (1 to 5), the area 411 of the IP address, and the area 421 of the extension number. FIGS. 5 to 8 show each list of the content to be stored in the memories of the respective terminals 60 (IP telephone 20-1, 20-2, and 20-3, and PC 30) shown in the example of FIG. 1. The list includes the area 500 indicating a terminal, the area 501 indicating the terminal 60's desiring extension number, the area 511 indicating the MAC address of the terminal 60, the area 521 indicating the IP address, the area 531 indicating the IP address of the Internet exchange 10 of the connecting destination, and the area 541 indicating the transmission data to be sent to the Internet exchange 10.

FIG. 12 is a block diagram showing one example of the network structure according to the embodiment, including the Internet exchange 10, the IP telephone 20, the PC 30, a router 40 for connecting LAN and WAN (Wide Area Network), a LAN line L6, and a WAN line L7. The number of the terminals 60 registered in the Internet exchange 10 depends on the processing capacity of the Internet exchange 10, and it need not be restricted. The following description will be made by way of example, in the case where four terminals 60 are provided and the maximum number of the terminals is five.

Figure 9:
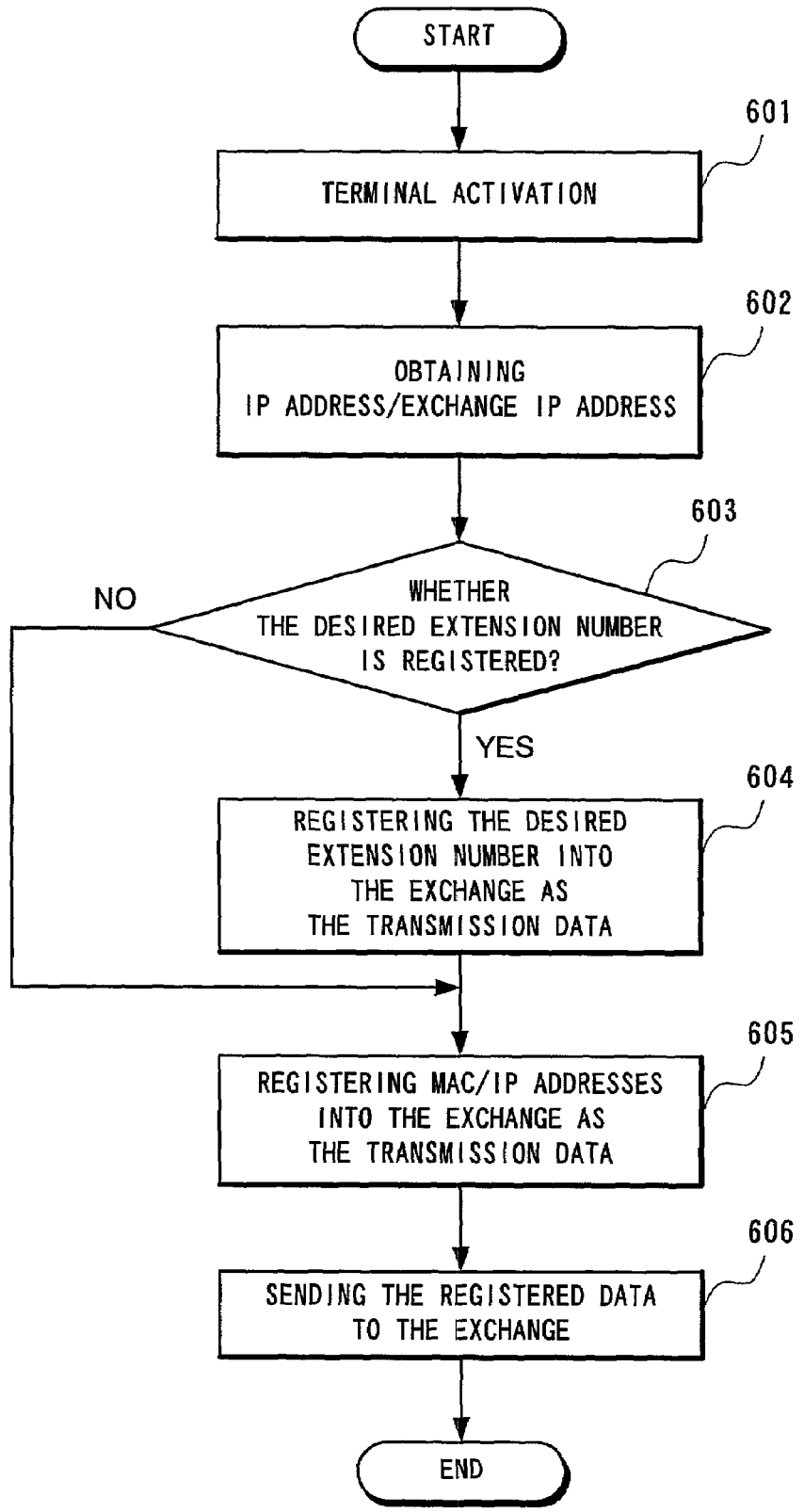
FIG. 9 is a flow chart for use in describing the processing at a time of activation of the terminal according to an embodiment of the present invention.
Figure 10:
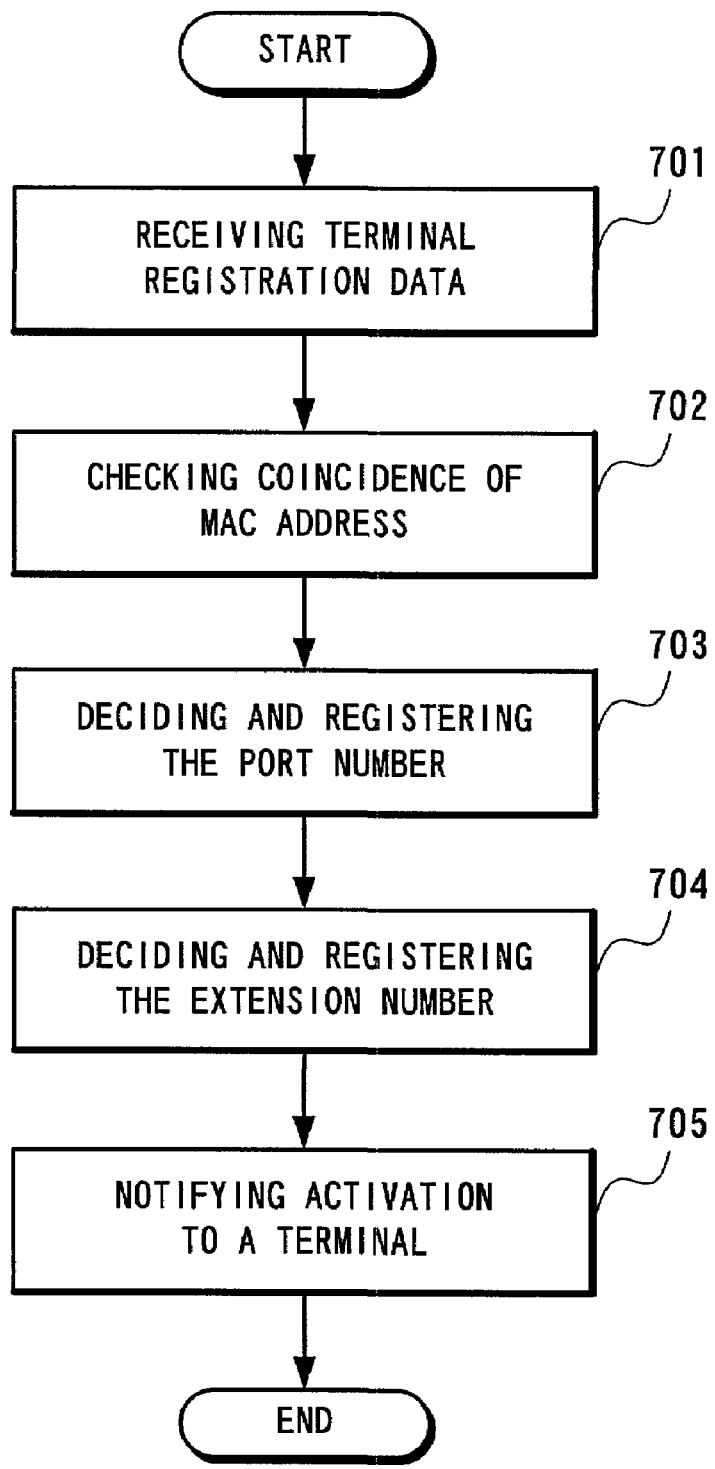
FIG. 10 is a flow chart for use in describing the registration processing of each terminal of the exchange according to an embodiment of the present invention.

At first, the state of each unit of the embodiment will be described with reference to FIGS. 1 to 5, and then the processing of the embodiment will be described with reference to the flow charts of FIG. 9 and FIG. 10. FIG. 9 is a flow chart for use in describing the processing for registering a terminal 60 into the Internet exchange 10 at activation, and FIG. 10 is a flow chart for use in describing the terminal registration processing of the Internet exchange 10.

In FIG. 1, the central control circuit 13 and the line control circuit 15 of the Internet exchange 10 are connected to each other by the LAN line L1 inside the Internet exchange 10, and they have the respective IP addresses, which are stored in the respective memories 14 and 16. The structure of the terminal information registration area of the memory 14 of the central control circuit 13 within the Internet exchange 10 is as shown in FIG. 4, and the MAC address, the IP address, and the extension number of the respective terminals 60 are stored in every extension port. The IP address of the central control circuit 13 is stored in the DHCP server 11. The respective terminals 60 (IP telephones 20-1 to 20-3 and PC 30) operate as a terminal of the Internet exchange 10.

FIG. 2 is a block diagram showing the structure of the IP telephone 20 according to the embodiment, and FIG. 3 is a block diagram showing the structure of the PC 30 according to the embodiment. FIG. 5 shows a list of the data to be stored in the memory, in the respective terminals 60 (IP telephones 20-1 to 20-3 and PC 30) of FIG. 1. The desired extension number, the MAC address, the IP address of the terminal itself, the IP address of the central control circuit 13 of the Internet exchange 10, and the transmission data to the Internet exchange 10 are stored in each memory 22 of the IP telephones 20-1 to 20-3 and the memory 32 of the PC 30, as illustrated in FIGS. 5 to 8.

The registration processing of the terminal into the Internet exchange 10 will be described with reference to the flow chart of FIG. 9.

The content of the memory within the Internet exchange 10 in the initial state will be described. The port numbers installed in the Internet exchange 10 are stored in sequence (1 to 5), in the area 400 of the port number in FIG. 4. In the initial state in which no terminal 60 is registered, each area of the MAC address registration area 401 of the terminal 60 and the IP address registration area 411 of the terminal 60 are empty. The initial value of the extension number of each port is stored in the area 421 of the extension number registration area.

The content of the memory inside the corresponding terminal in the initial state will be described.

The extension number desired by each terminal is stored in the corresponding desired extension number area 501 in FIGS. 5 to 8. The desired extension number area 501 will be described in the following embodiment, for example, by a method in which this area turns empty if the number is registered in the Internet exchange 10. Besides, a method in which the desired extension number is always kept even after registration of the number without making the desired extension number area 501 empty can be adopted. When there is no desired extension number, it is not necessary to enter any value into this area 501 but the Internet exchange 10 automatically assigns the extension number.

The MAC address inherent of each terminal is stored in the MAC address area 511. The respective areas of the terminal IP address area 521, the exchange IP address area 531, and the transmission data area 541 to the Internet exchange 10 are empty before activation.

The respective terminals 60 (IP telephones 20-1 to 20-3 and PC 30) start at first (Step 601).

The CPU of each terminal receives the IP address of the own terminal from the DHCP server within the Internet exchange 10 and stores it into the IP address area 521 of the corresponding memory. Similarly, each terminal receives the IP address of the central control circuit 13 of the Internet exchange 10 of the registration destination and stores it in the exchange IP address area 531 of the corresponding memory (Step 602).

Specifically, the IP telephone 20-1 receives its own IP address and the IP address of the central control circuit 13 of its belonging Internet exchange 10 from the DHCP server 11, and stores them respectively in the IP address area 521 and the exchange IP address area 531 of the memory 22. Similarly, the IP telephones 20-2 and 20-3 receive their own IP addresses and the IP address of the central control circuit 13 of their belonging Internet exchange 10, from the DHCP server 11, and stores them in the areas of the respective memories 22. The PC 30 also receives its own IP address and the IP address of the central control circuit 13 of its belonging Internet exchange 10 from the DHCP server 11 and stores them in the memory 32.

A communication path between the DHCP server 11 and each terminal 60 extends from the exchange LAN line L1 to the LAN interface 12, the IP telephone LAN line L5, and the LAN interface 21, in the case of the IP telephones 20-1 to 20-3, and similarly, it extends from the exchange LAN line L1 to the LAN interface 12, the personal computer LAN line L4, and the LAN interface 31 in the case of the PC 30.

Each CPU of the terminals starts the registration processing into the Internet exchange 10.

Each of the terminals reads out the content from the desired extension number area 501. When the desired extension number is stored, the value is registered in the transmission data. Thereafter, the content of the desired extension number area 501 is deleted and turned empty (Step 603 and Step 604).

In the example of FIGS. 5 to 8, the IP telephone 20-1 registers the extension number "10" in the transmission data area 541 and clears the desired extension number area 501. The IP telephone 20-2 registers the number "14" into the transmission data area 541 and clears the desired extension number area 501. The IP telephone 20-3 registers the number "10" into the transmission data area 541 and clears the desired extension number area 501. The PC 30 registers nothing into the transmission data area 541 because the desired extension number area 501 is empty.

The respective CPUs 23 and 33 of the terminals 60 register the MAC address and its own IP address assigned by the DHCP server 11 in the transmission data (Step 605).

Specifically, the IP telephone 20-1 reads out the MAC address from the area 511 of the memory 22 and the IP address from the area 521 and registers them in the transmission data 541. Similarly, the IP telephone 20-2 and the IP telephone 20-3 read out the MAC address from the area 511 of the memory 22 and the IP address from the area 521 thereof and register them in the transmission data 541. The PC 30 reads out the MAC address from the area 511 and the IP address from the area 521 of the memory 32 and registers them in the transmission data 541.

Each CPU of the terminals sends the transmission data to the central control circuit 13 of the Internet exchange 10 to register it (Step 606).

Specifically, the IP telephone 20-1 sends the transmission data 541 to the central control circuit 13 of the Internet exchange 10 corresponding to the exchange IP address stored in the memory 22, to register it. Similarly, the IP telephone 20-2 sends the transmission data 541 to the central control circuit 13 of the exchange corresponding to the exchange IP address, to register it. The PC 30 also sends the transmission data 541 to the central control circuit 13 of the exchange corresponding to the exchange IP address stored in the memory 32, to register it.

Each communication path between the central control circuit 13 within the Internet exchange 10 and the respective terminals 60 (IP telephones 20-1 to 20-3 and PC 30) extends from the exchange LAN line L1 to the LAN interface 12, the IP telephone LAN line L5, and the LAN interface 21, in the case of the IP telephones 20-1 to 20-3.

Figure 11:
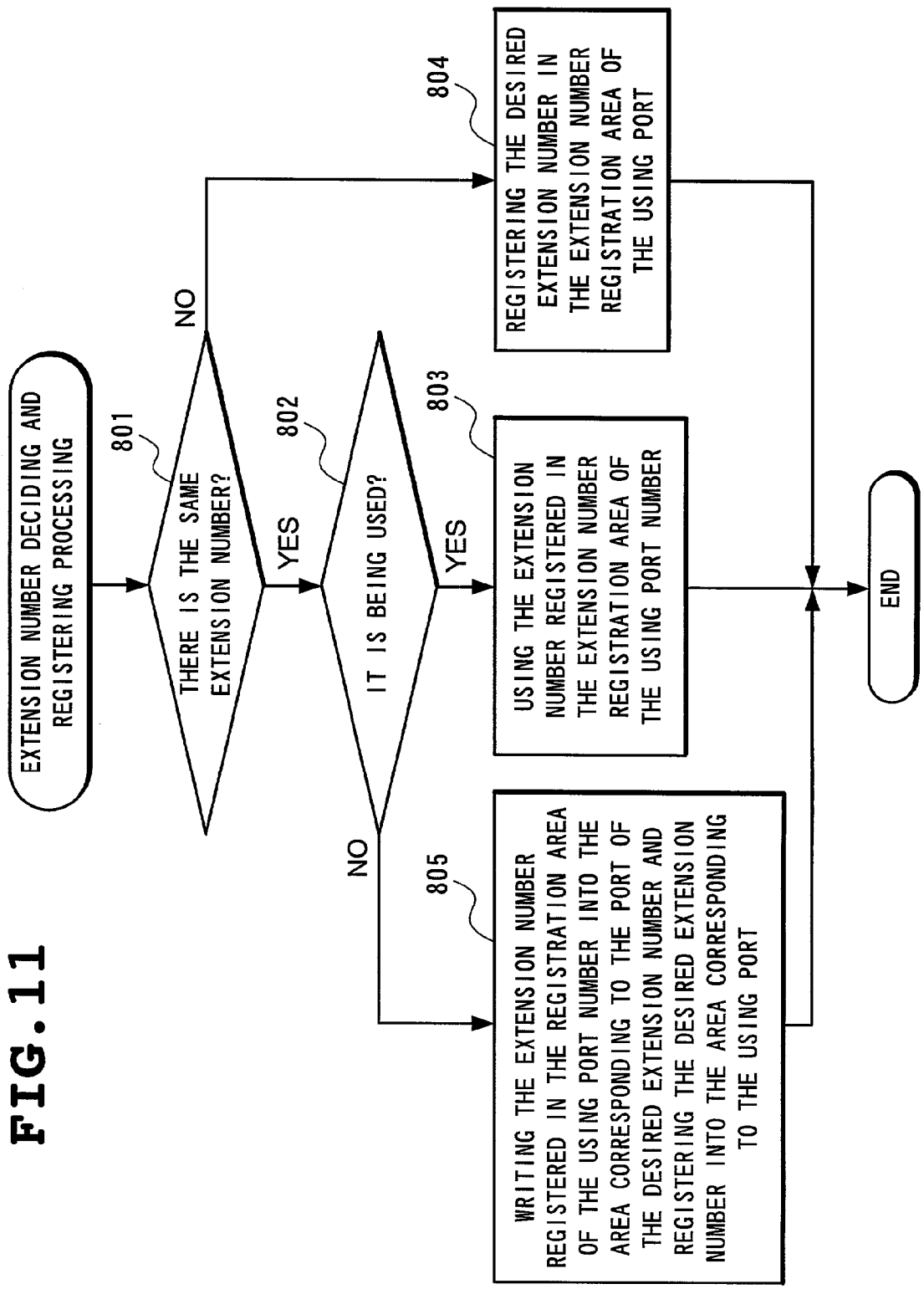
FIG. 11 is a flow chart for use in describing the content of the extension number deciding and registering processing in the registration processing of each terminal of the exchange.

The terminal registration processing of the Internet exchange 10 will be described with reference to the flow charts of FIG. 10 and FIG. 11.

At first, the transmission data to be registered is sent from the terminals to the central control circuit 13 of the Internet exchange 10 (Step 701). The transmission sequence at this time depends on the congestion state of the LAN and the order of activating the terminal. In this embodiment, the description will be made, for example, in the case where the data arrives at the central control circuit 13 in the order of the IP telephone 20-1, the PC 30, the IP telephone 20-2, and the IP telephone 20-3.

The central control circuit 13 takes out the MAC address from the sent data and checks whether the same MAC address exists in the MAC address registration area 401 of the terminal table of FIG. 4 stored in the memory 14 of the central control circuit 13. When there exists the same entry, the terminal is registered in the corresponding port number. When there exists no same entry, such a terminal is registered in the port number where none of the MAC address and the IP address is registered, in the increasing order of number (Step 702 and Step 703).

Namely, since the MAC address registered in the transmission data from the IP telephone 20-1 first received does not exist in any MAC address registration area 401 which is all empty because of being in the initial state, the IP telephone 20-1 has the port number "1" assigned. The MAC address of the IP telephone 20-1 is registered in the MAC address registration area 401 and the IP address is registered in the IP address registration area 411.

Since the MAC address registered in the transmission data from the PC 30 second received does not exist in any MAC registration area 401, the PC 30 has the port number "2" assigned. The MAC address of the PC 30 is registered in the MAC registration area 401 and the IP address is registered in the IP address registration area 411.

Since the MAC address registered in the transmission data from the IP telephone 20-2 third received does not exist in any MAC registration area 401, the IP telephone 20-2 has the port number "31" assigned. The MAC address of the IP telephone 20-2 is registered in the MAC registration area 401 and the IP address is registered in the IP address registration area 411.

Since the MAC address registered in the transmission data from the IP telephone 20-3 last received does not exist in any MAC registration area 401, the IP telephone 20-3 has the port number "4" assigned. The MAC address of the IP telephone 20-3 is registered in the MAC registration area 401 and the IP address is registered in the IP address registration area 411.

The central control circuit 13 is to perform the extension number deciding and registering processing (Step 704) described below. This extension number deciding and registering processing is shown in FIG. 11. Specifically, the central control circuit 13 takes out the desired extension number from the sent data and checks whether there is the same extension number in the extension number registration area 421 of the terminal table of FIG. 4 included in the memory 14 of the central control circuit 13 and it is being used (Steps 801 and 802). Whether it is being used or not is determined by the presence of the MAC address and the IP address being registered.

When it is being used (Yes in Step 802), the desired extension number is rejected and the extension number already registered in the extension number registration area 421 of the using port number is used (Step 803). When there is no same extension number (No in Step 801), the desired extension number is registered in the extension number registration area 421 of the using port number (Step 804). Thus, the extension number deciding and registering processing is completed.

When there is the same extension number and it is not being used, the extension number registered in the extension number registration area 421 of the using port number is written into the extension number registration area 421 of the port number where the desired extension number has been registered, and thereafter the desired extension number is registered in the extension number registration area 421 of the using port number (Step 805).

Specifically, the desired extension number of the data from the IP telephone 20-1 first received is "10", and it is the same as the extension number registered in the extension number registration area 421 of the using port number. Therefore, the value of the extension number registration area 421 is used as it is.

The desired extension number of the data from the PC 30 second received is empty. Therefore, the value "11" of the extension number registration area 421 of the using port is used as it is.

The desired extension number of the data from the IP telephone 20-2 third received is "14", and the retrieval in all the extension number registration areas 421 finds it in the extension number registration area 421 of the port number 5. The content of the MAC address area 401 and the IP address area 411 of the port number 5 is read out and proves to be empty. Therefore, the extension number "14" registered in the extension number registration area 421 proves to be unused. After the value "12" of the extension number registration area 421 of the using port number is registered, the desired extension number "14" is registered in the extension number registration area 421 of the using port.

The desired extension number of the data from the IP telephone 20-3 last received is "10" and the retrieval in all the extension number registration area 421 finds it in the extension number registration area 421 of the port number "1". The content of the MAC address area 401 and the IP address area 411 of the port number "1" is read out. Since the MAC address and the IP address of the IP telephone 20-1 have been already registered in the area 401 and the area 411, the extension number "10" registered in the extension number registration area 421 proves to be used. Accordingly, the desired extension number "10" cannot be used, and therefore the value "13" in the extension number registration area 421 is used as it is.

According to the above processing, the IP telephone 20-1 has the extension number "10", the IP telephone 20-2 has the extension number "14", and the IP telephone 20-3 has the extension number "13", and the PC 30 has the extension number "11" assigned respectively.

Thus, the registration of the terminals has been completed, and the Internet exchange 10 can show the extension numbers assigned to the respective terminals and notify the activation (Step 705). Specifically, the respective extension numbers are displayed on the respective display units 27 of the IP telephones; the extension number "10" is displayed on the IP telephone 20-1, the extension number "14", is displayed on the IP telephone 20-2, and the extension number "13" is displayed on the IP telephone 20-3. The extension number "11" is displayed on the display unit 35 of the PC 30.

Signal exchange at a time of displaying the extension number is performed in the order of the exchange LAN line L1, the LAN interface 12, the IP telephone LAN line L5, the LAN interface 21, the display control unit 26, and the display unit 27, in the case of the IP telephones 20-1 to 20-3, and it is done in the order of the exchange LAN line L1, the LAN interface 12, the personal computer LAN line L4, the LAN interface 31, the display control unit 34, and the display unit 35, in the case of the PC 30.

The processing in the case where the registered terminal turns on the power again after once turning off will be described. Here, the case where the IP telephone 20-3 turns on the power again after turning off, posterior to the above-mentioned registration processing, will be considered.

At first, the IP telephone 20-3 starts (Step 601). The IP telephone 20-3 receives its own IP address and the IP address of the central control circuit 13 of its belonging Internet exchange 10 from the DHCP server 11 and stores them respectively in the corresponding areas 521 and 531 of the memory 22.

Assume that the address different from the IP address registered in the Internet exchange 10 is received from the DHCP server 11 as the IP address of the IP telephone 20-3 (Step 602).

The IP telephone 20-1 sends the transmission data 541 to the Internet exchange 10. Since the desired extension number has been already registered in the Internet exchange 10, the desired extension number area is cleared to be empty, and it is not registered in the transmission data area 541 (Steps 603 and 604). The IP telephones 20-2, 20-3 read out the MAC address and the IP address from the memory 22 and registers them in the transmission data area 541 (Step 605). The IP telephone 20-3 sends the transmission data 541 to the central control circuit 13 of the exchange having the exchange IP address to register it (Step 606).

The data from the IP telephone 20-3 is sent to the central control circuit 13 on the side of the Internet exchange 10 (Step 701).

The Internet exchange 10 detects that the MAC address of the received data from the IP telephone 20-3 already exists in the MAC registration area 401, hence to correctly assign the port number "4" to the IP telephone 20-3. The IP address of the IP telephone 20-3 is registered in the IP address registration area 411 (Step 702 and Step 703).

The desired extension number of the received data from the IP telephone 20-3 is empty. Therefore, the value "13" of the extension number registration area 421 of the using port (namely, the registered extension number) is used as it is.

According to the above processing, the registration processing of the IP telephone 20-3 has been completed. The Internet exchange 10 shows the extension number "13" assigned to the IP telephone 20-3 and notifies the activation (Step 705). According to the above processing, the IP telephone 20-3 can use the same extension number and port number even after its IP address is changed when turning on/off and it can use the previous setting as it is.

The other embodiments and forms of the present invention will be described this time.

Although the DHCP server 11 is provided inside the Internet exchange 10 in the above-mentioned embodiment, the DHCP server 11 may be provided outside the Internet exchange 10. In this case, the DHCP server 11 should be positioned on the LAN line L6 or the WAN line L7 of FIG. 12. Here, since the DHCP server 11 is cut off from the central control circuit 13 of the Internet exchange 10, the IP address of the central control circuit 13 is not automatically registered but it must be set by hand.

Although all the terminals 60 (IP telephone 20-1 to 20-3 and PC 30) are registered in the same Internet exchange 10 in the above-mentioned embodiment, they may be registered in the separate Internet exchanges. In this case, it is necessary to enter the exchange IP addresses to be registered in the DHCP servers 11, for every MAC address of the terminals, by hand. The general DHCP server can change the notifying information in every MAC address.

Although all the terminals 60 (IP telephones 20-1 to 20-3 and PC 30) exist on the same LAN line L6 in the above-mentioned embodiment, they may be positioned on the WAN line L7, or on both the L6 and L7. In this case, there is no remarkable change in the embodiment.

Although the description has been made about only the registration of the terminals into the central control circuit 13 of the Internet exchange 10 in the above-mentioned embodiment, the line control circuit 15 is also registered in the central control circuit 13 similarly. In this case, a table for line control circuit registration without the extension number area 421 is created in the memory 14 of the central control circuit 13, in the same structure as that of FIG. 4, and a table without the desired extension number area 501 is created in the memory 16 of the line control circuit, in the same structure as that of FIG. 5. Thus, the line control circuit can be automatically registered in the central control circuit, and even if its IP address is changed as a result of turning on/off, the central control circuit can uniquely recognize the line control circuit and take over the previous line setting.

Alternatively, the line control circuit may be positioned on the outside LAN line or WAN line not on the inside LAN line L1 of the exchange. In this case, the line control circuit 15 may be positioned on the outside LAN line L6 or WAN line L7, and the memory 16, the line interface 17, and the public lines L2 and L3 may be connected there.

Although it is only the extension number that all the terminals request the Internet exchange 10 as the set value in the above-mentioned embodiment, any terminal setting value may be used. In this case, the value stored in the memory is not the extension number but the terminal setting value.

Although the above-mentioned embodiment uses, by way of example, the Internet exchange and its terminals, the present invention is not restricted to the exchange but it can be adopted to any server and client on the Internet. In this case, the extension number is replaced with the individual information (identifying information) depending on the device.

It is needless to say that the communication system according to the above respective forms can realize a function of terminal registration in the Internet exchange 10, a function of automatic transmission of the MAC address and the desired extension number in the respective terminals 60 (IP telephones 20-1 to 20-3 and PC 30), and the other function by the hardware devices, and further the present invention can be realized by loading a connection setting program that is a computer program having each function, into a memory of the computer processor. This connection setting program is stored in the storing mediums 90, 91, and 92 such as a magnetic disk, a semiconductor memory, and the like. The program is loaded from the storing medium into the computer processor, so to control the operation of the computer processor, thereby realizing the above-mentioned functions.

As mentioned above, although the present invention has been described by taking preferred embodiments and forms, by way of example, the present invention is not necessarily restricted to the above embodiments and forms, but various modifications can be made within the scope and the spirit of the invention.

According to the present invention, the following effects can be achieved.

At first, the present invention, as shown in the above respective embodiments, requires no special setting operation for automatically exchanging the address information between the terminals and the exchange, but only the operation of turning on the power of the Internet exchange and the Internet terminals enables the use of the basic function of the exchange.

At second, according to the present invention, since a collision avoiding function of the extension numbers is installed in the exchange, a desired extension number can be supplied to even such a terminal that cannot predict which extension number is assigned by automatic setting and accordingly that has the IP address dynamically assigned, thereby controlling the assigned extension numbers.

At third, according to the present invention, since a terminal notifies the MAC address inherent of itself to the exchange at a time of registration and the exchange stores it, even when the IP address is changed while the terminal turns on/off the power, the exchange can always uniquely recognize the terminal and take over the previous setting of the terminal.

At fourth, according to the present invention, since the IP address of the exchange is separately sent to each terminal, even if there exist some terminals to be registered in different exchanges in a mixed way on the same LAN, the terminals can establish a connection without confusing the registration destination.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A communication system for connecting a terminal to an outside communication network through a server operating as an exchange, wherein
    said terminal sending transmission data including its own terminal identification information for identifying said terminal uniquely to said exchange together with a request to said exchange to provide a setting for connection with said communication network, and
    said exchange receiving said request and searching for stored communication setting information of said terminal, according to said received terminal identification information of said terminal, said exchange performing the connection setting for connecting said terminal to said communication network based on the stored communication setting information
    wherein
    said terminal sending terminal setting information indicating content of its desiring setting, which is included in said transmission data, to said exchange, when requesting said connection setting to said exchange, and
    said exchange determining whether the setting for said terminal indicated by said terminal setting information is possible, with reference to said received terminal setting information of said terminal, when receiving said connection setting request from said terminal, and
    said exchange performing the connection setting for connecting said terminal to said communication network, based on said terminal setting information, when the setting indicated by said terminal setting information is possible.

2. The communication system as set forth in claim 1, wherein said terminal enters its own extension number in said terminal setting information.

3. The communication system as set forth in claim 1, wherein said terminal identification information of said terminal includes a MAC address of said terminal.

4. The communication system as set forth in claim 1, wherein said communication network comprises at least the Internet.

5. The communication system as set forth in claim 1, wherein said terminal automatically sends the connection setting request to said exchange at activation.

6. An exchange connected to an outside communication network, for relaying a connection from a terminal to said communication network, wherein said exchange is implement by a server and wherein:
    said exchange receiving a connection setting request from said terminal for connecting said terminal to said communication network, wherein said request including terminal identification information of said terminal for identifying said terminal uniquely, and
    said exchange searching for stored communication setting information of said terminal, according to said received terminal identification information of said terminal and performing the connection setting for connecting said terminal to said communication network, according to said communication setting information, wherein said exchange
    receives terminal setting information indicating content of setting desired, when receiving the connection setting request from said terminal,
    determines whether the setting for said terminal indicated by said terminal setting information is possible, with reference to said received terminal setting information of said terminal, and
    performs the connection setting for connecting said terminal to said communication network, based on said terminal setting information, when the setting indicated by said terminal setting information is possible.

7. The exchange as set forth in claim 6, wherein said terminal setting information of said terminal includes extension number whose setting is requested by said terminal.

8. The exchange as set forth in claim 6, wherein said terminal identification information of said terminal includes a MAC address of said terminal.

9. The exchange as set forth in claim 6, wherein said communication network comprises at least the Internet.

10. A method of setting a connection from a terminal to an outside communication network through a server operating as an exchange connected to said communication network, said exchange relaying the connection, comprising the following steps of:
    said terminal sending its own terminal identification information for identifying said terminal uniquely to said exchange together with a connection setting request to said exchange for a setting for connection with said communication network;
    said exchange receiving said connection setting request, and searching for stored communication setting information of said terminal, according to said received terminal identification information of said terminal, said exchange performing the connection setting for connecting said terminal to said communication network, according to said communication setting information;
    said exchange storing said communication setting information for every terminal to make a reference;
    said exchange checking whether said communication setting information of said terminal is stored, by using said terminal identification information of said terminal in the connection setting request;

said exchange performing the connection setting for connecting said terminal to said communication network, according to said stored communication setting information, when said communication setting information of said terminal is stored;

said exchange receiving terminal setting information indicating content of setting desired for the connection setting, in the connection setting request from said terminal;

said exchange determining whether the setting for said terminal indicated by said terminal setting information is possible, with reference to said received terminal setting information of said terminal; and said exchange performing the connection setting for connecting said terminal to said communication network, based on said terminal setting information, when the setting indicated by said terminal setting information is possible.

11. The connection setting method as set forth in claim 10, wherein said terminal setting information of said terminal includes extension number whose setting is requested by said terminal.

12. The connection setting method as set forth in claim 10, wherein said terminal identification information of said terminal includes a MAC address of said terminal.

13. A connection setting program storage medium storing a connection setting program which is executable on a computer to cause said computer to operate for connecting a terminal to an outside communication network, comprising the following functions of:

said terminal sending its own terminal identification information for identifying said terminal uniquely to said computer, so to request said connection setting program a setting for connection with said communication network;

said connection setting program receiving the connection setting request, and searching for stored communication setting information of said terminal, according to said received terminal identification information of said terminal, and said connection program performing the connection setting for connecting said terminal to said communication network, according to said communication setting information;

said connection setting program storing said communication setting information for every terminal to make a reference;

said connection setting program checking whether said communication setting information of said terminal is stored, by using said terminal identification information of said terminal in the connection setting request;

said connection setting program performing the connection setting for connecting said terminal to said communication network, according to said stored communication setting information, when said communication setting information of said terminal is stored;

said connection program receiving terminal setting information indicating content of setting desired for the connection setting, in the connection setting request from said terminal;

said connection program determining whether the setting for said terminal indicated by said terminal setting information is possible, with reference to said received terminal setting information of said terminal; and said connection program performing the connection setting for connecting said terminal to said communication network, based on said terminal setting information, when the setting indicated by said terminal setting information is possible.

14. The connection setting program as set forth in claim 13, wherein said terminal setting information of said terminal includes extension number whose setting is requested by said terminal.

15. The connection setting program as set forth in claim 13, wherein the terminal identification value of said terminal is MAC address of said terminal.

16. The connection setting program as set forth in claim 13, wherein said communication network comprises at least the Internet.

17. A server connected to an outside communication network, for setting a connection from a terminal to the communication network, wherein said server receiving a connection setting request from said terminal for connecting said terminal to said communication network, including terminal identification information of said terminal for identifying said terminal uniquely; and said server searching for stored communication setting information of said terminal, according to said received terminal identification information of said terminal and performing the connection setting for connecting said terminal to said communication network, according to said communication setting information wherein:

said server receiving terminal setting information indicating content of the desired setting, in the connection setting request from said terminal;

said server determining whether the setting for said terminal indicated by said terminal setting information is possible, with reference to said received terminal setting information of said terminal; and said server performing the connection setting for connecting said terminal to said communication network, based on said terminal setting information, when the setting indicated by said terminal setting information is possible.

18. The server as set forth in claim 17, wherein said terminal setting information of said terminal includes extension number whose setting is requested by said terminal.

19. The server as set forth in claim 17, wherein said terminal identification information of said terminal includes a MAC address of said terminal.

20. The server as set forth in claim 17, wherein said communication network comprises at least the Internet.

* * * * *